United States Patent
Sorum et al.

(10) Patent No.: US 7,113,668 B2
(45) Date of Patent: Sep. 26, 2006

(54) SYSTEM FOR THE TRANSMISSION OF SIGNALS TO OR BETWEEN UNDERWATER INSTALLATIONS

(75) Inventors: Anders Sorum, Stavanger (NO); Jens-Henrik Neuenkirchen, Sandnes (NO)

(73) Assignee: Statoil ASA, Stavanger (NO)

(*) Notice: Subject to any disclaimer, the term of this patent is extended or adjusted under 35 U.S.C. 154(b) by 0 days.

(21) Appl. No.: 10/478,855
(22) PCT Filed: May 27, 2002
(86) PCT No.: PCT/NO02/00184

§ 371 (c)(1),
(2), (4) Date: Nov. 25, 2003

(87) PCT Pub. No.: WO02/098013

PCT Pub. Date: Dec. 5, 2002

(65) Prior Publication Data

US 2004/0151427 A1    Aug. 5, 2004

(30) Foreign Application Priority Data

May 30, 2001    (NO) .................................. 20012669

(51) Int. Cl.
G02B 6/26      (2006.01)
G02B 6/42      (2006.01)
(52) U.S. Cl. ........................................ 385/27; 385/147
(58) Field of Classification Search .................. 385/14, 385/27, 88, 89, 147
See application file for complete search history.

(56) References Cited

U.S. PATENT DOCUMENTS 4,142,178 A    2/1979    Whyte et al.
5,892,773 A *  4/1999    Rolls .......................... 370/480
2002/0110311 A1* 8/2002  Kline .......................... 385/15

FOREIGN PATENT DOCUMENTS

WO    WO 95/29536 A1    11/1995
WO    WO 9529536    *    11/1995
WO    WO 01/82497        11/2001

* cited by examiner

Primary Examiner—Frank G. Font
Assistant Examiner—Derek L. Dupuis
(74) Attorney, Agent, or Firm—Foley & Lardner LLP

(57) ABSTRACT

A system for the transmission of signals to or between underwater installations, uses optical fibres for the transmission of optical signals to/from a control unit or between the installations. The system includes a conversion unit coupled to one of the ends of the optical fibre for conversion of the optical signals to high frequency radio signals and/or conversion of high frequency radio signals to optical signals, a conversion unit having a coupling to an electrical power supply cable for the transmission of power to the underwater installation, where the coupling unit is coupled to the conversion unit to transfer the high frequency radio signal along the power supply cable to and/or from the underwater installation, and at least one transducer unit in the underwater installation for receiving and/or emission of the high frequency radio signal.

7 Claims, 4 Drawing Sheets

SYSTEM FOR THE TRANSMISSION OF SIGNALS TO OR BETWEEN UNDERWATER INSTALLATIONS

CROSS-REFERENCE TO RELATED APPLICATIONS

This application is an application under 35 USC § 371 of PCT/NO02/00184 filed on May 27, 2002 and claims foreign priority from application NORWAY 2001.2669 filed on May 30, 2001.

BACKGROUND OF THE INVENTION

1. Field of the Invention

This invention relates to a system for transmission of signals to or between underwater installations, comprising optical fibres for the transmission of signals to/from a control unit or between the installations.

2. Description of the Related Art

In modern offshore oil installations several underwater installations are presently often used as processing plants and wells. In addition to be supplied with power these installations will also have to be supplied with control signals.

In signal transmission over longer distances optical fibres have proved to be a favourable solution. However, in transmission and distribution of signals between installations within a limited area optical transmission represents a very expensive solution, as there are stringent requirements on accuracy as well as water resistance of the optical fibres and because the coupling processes performed under water can be very complicated. Locally there will be an advantage to have other coupling types and solutions.

A number of proposals exist for solving the problems of underwater fibre optic coupling. One example is given in U.S. Pat. No. 5,007,697 concerning an inductive coupler where the optical signal is converted to an electrical signal in the first coupling part and is transferred via induction to the other coupling part before the signal is converted back to an optical signal. This solution represents one example of the complex and expensive solutions of the prior art, and comprises, in addition to the coupling part itself, inductive coupling arrangements for taking power from existing power lines.

A system for transmission of signals in a combined RF and optical network is described in U.S. Pat. No. 5,892,773. In this case optical fibre is coupled to a conversion unit which is also coupled to one or more cables. The conversion unit converts optical signals to electrical signals in the radiofrequency range which is further distributed in the network using among other things control of the frequency ranges of the electrical signals. This system may in principle be used in underwater applications as there is a prerequisite for only a single fibre optic coupling, however, this requires dedicated cables for the further transmission of the signal. These cables either have to transmit the signals on to every single installation directly or have to be branched out using additional coupling points. In addition a power supply and corresponding equipment for operating the conversion unit are required, and the solution maintains the need for a dedicated network for the signal transmission, which increases the complexity of the underwater installation. This solution is for this reason not very attractive for underwater installations either.

BRIEF SUMMARY OF THE INVENTION

It is a purpose of the present invention to provide a system for transmission of signals to or between underwater installations where the transmission over longer distances may be performed optically, while transmission locally may be performed without the use of expensive coupling devices and dedicated solutions.

It is also a purpose of this invention to provide a solution which to the largest possible extent uses already existing solutions for transmitting signals such that unnecessary complexity is avoided in the installation on the sea floor.

These purposes are achieved in a system as mentioned above which is characterized as given in claim 1.

Hence a system is obtained which uses the existing power supply system for the transmission of signals, for example for the control of the individual components in the underwater installations. This is achieved without large interventions in the existing system and without using a dedicated network for the signal transmission.

BRIEF DESCRIPTION OF THE DRAWINGS

The invention will be described in more detail with reference to the drawings which illustrate the invention by way of example.

DETAILED DESCRIPTION OF THE INVENTION

Figure 1:
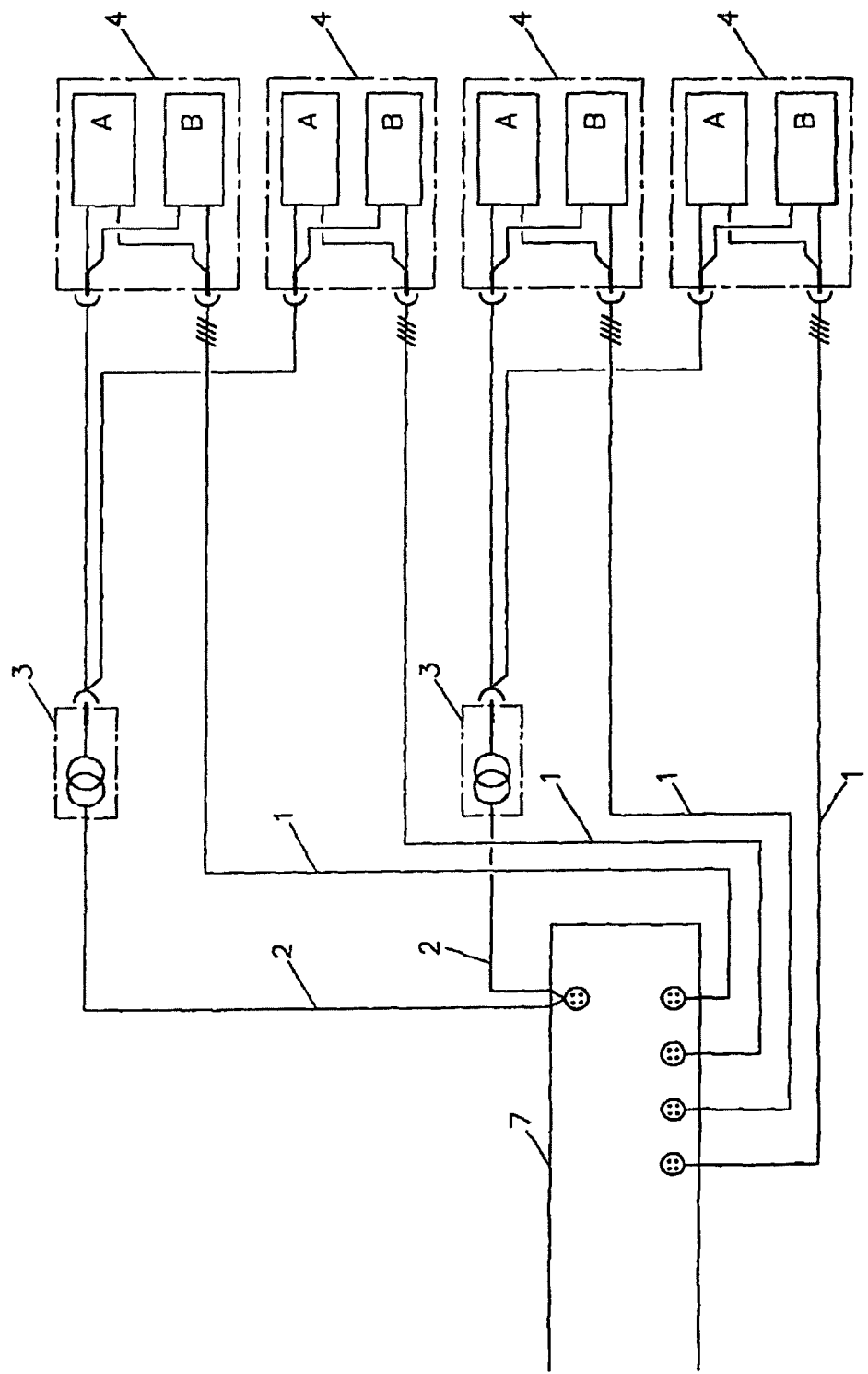
FIG. 1 illustrates a system according to prior art.

FIG. 1 shows a system according to prior art in which signals are transmitted to the control units in a number of installations 4 via one optical fibre 1 per installation, while the power supply is distributed via couplings 3. The system according to the figure is operating in duplex with double set A, B of equipment in the control units for safety reasons. Both fibres 1 and the power supply 2 are led out from a central terminating head 7, for example for an umbilical comprising both power supply and optical fibres for signal transmission. This is, as mentioned above, an expensive solution.

Figure 2:
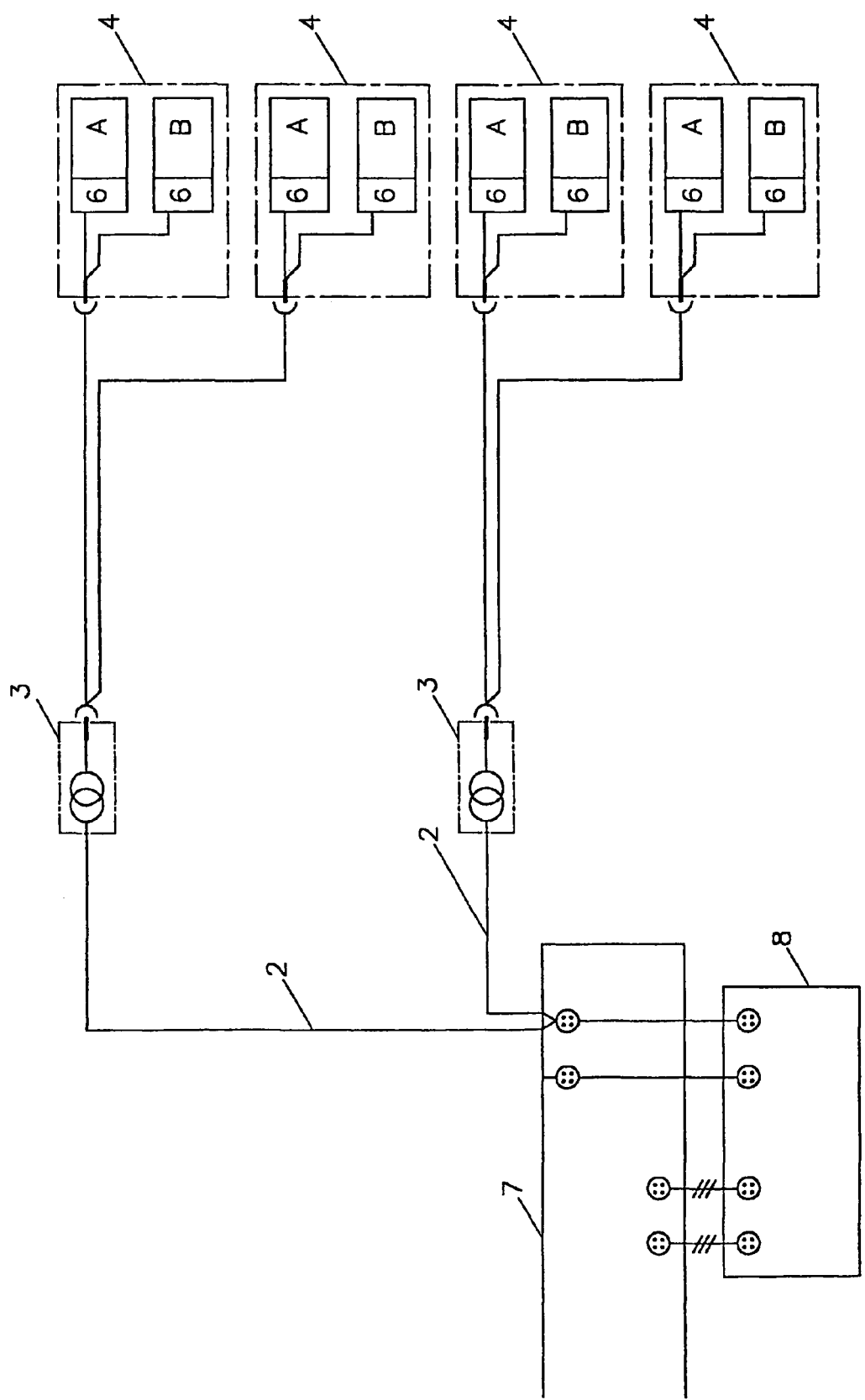
FIG. 2 illustrates a system according the invention.

In FIG. 2 the system according to the invention is shown where it is apparent that the optical fibres between the central unit 7 and the underwater installations are removed. The signal is converted in a converter 8 and superposed on the power supply 3 such that the signal is distributed along the same lines 2 as the power supply. In this way the converted optical signals are transferred via the couplings 3 of the power supply without cost-driving components. In the control units 4 the signal is separated from the power cable using known units 6.

At the terminating head 7 the converted optical signal may be transferred equally in all available signal directions, such that the information which is relevant for a given control unit 4 may be filtered out locally at the control unit using technology known per se based on the coding of the signal.

Alternatively, the signal of the individual control units 4 may be addressed to the individual units in order to save transmission bandwidth, for example by the choice of frequency range and filtering of the signal at the couplings 3.

Figure 3:
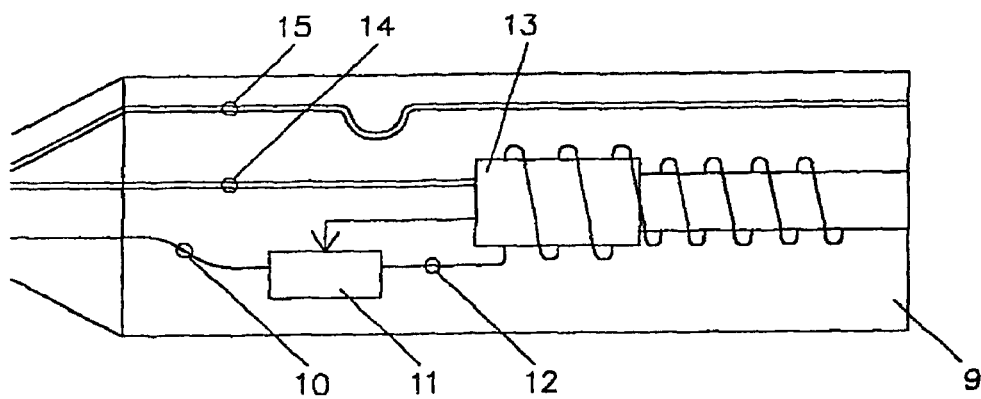
FIG. 3 illustrates a coupling for use in a system according to the invention.

FIG. 3 shows schematically how a coupling unit 9 according to the invention may be constructed comprising optical 10, hydraulic 15 and electrical 14 conductors, and where the optical signal is converted to an electrical signal in the coupling unit. The optical signal in the fibre 10 is converted to an analogue electrical signal in the conversion circuit 11. The conversion circuit 11 is supplied with an antenna 12 which is coupled to the electrical power supply cable 14, in this case to an electrical coupler 13 in the coupling unit 9.

The transmission of the converted optical signal through the antennae to the electrical cable is not direct but based on the radiation of radio waves, such that no physical intrusion into the cable itself is made. The integrity of the cable is maintained in that the intrusions on this is maintained at a minimum, as the isolating material is kept intact apart from what is normal at the terminations, and there is no direct electrical coupling to the cable. In the illustration the antennae is placed around the electrical cable, but it is clear that it may be placed in some distance away from this around the cable itself, depending on the practical solution used, where the only requirement on the distance is that sufficiently good transmission of the signal is obtained. Hence, the maximum distance will among other things depend on the possibility of electromagnetic signal propagation through the medium and the amplitude of the applied signal.

The coupling unit in FIG. 3 may of course also be adapted to work the opposite way round in that a signal superposed on the electrical coupling part may be picked up by the antennae 12 and converted to an optical signal which is further sent through the optical fibre 10.

Figure 4:
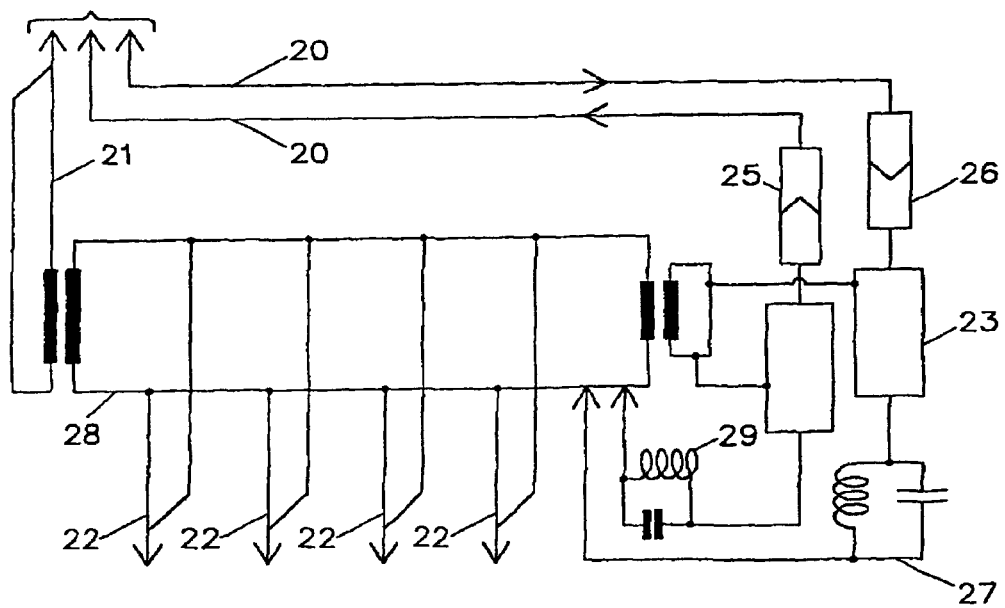
FIG. 4 illustrates schematically an example of a coupling circuit for use in a system according to the invention.

FIG. 4 shows an example of an optical-electrical conversion unit coupled with a transformer 28 for transforming and distributing power from a high voltage power supply cable 21 to the individual installations via associated cables 22 in a low voltage network. The converter comprises two optical-electrical converters 25, 26 adapted to convert respectively electrical signals to optical signals and vice versa. The optical-electrical converters may comprise any type of transducers which are suitable for detecting or transmitting optical signals.

An optical signal received from an optical fibre 20 passes through a detector 26, and further through a transmitter 23 and a band pass filter 27 to a transformer 28, where the signal is superposed on the power supply cables 22 to the individual installations. The frequency range may be chosen within a wide range, but will typically be in the UHF-range, preferably around 450 MHz.

Signals received from the low voltage network 22 in the same manner passes through a band pass filter 29 via a receiver to an electrical-optical transformer 25, for example a semiconductor laser. The signal from the network is then further transferred through a dedicated optical fibre 20 or, using a coupler (not shown), via the same fibre as the incoming signal.

The transmission capacity of the system will depend on the elements used, but may become as high as 900 MHz, which is more than sufficient for present bandwidth, which is in the range of 2400 baud. A typical bandwidth for the system according to the invention is expected to be in the range of 450 MHz.

Figure 5:
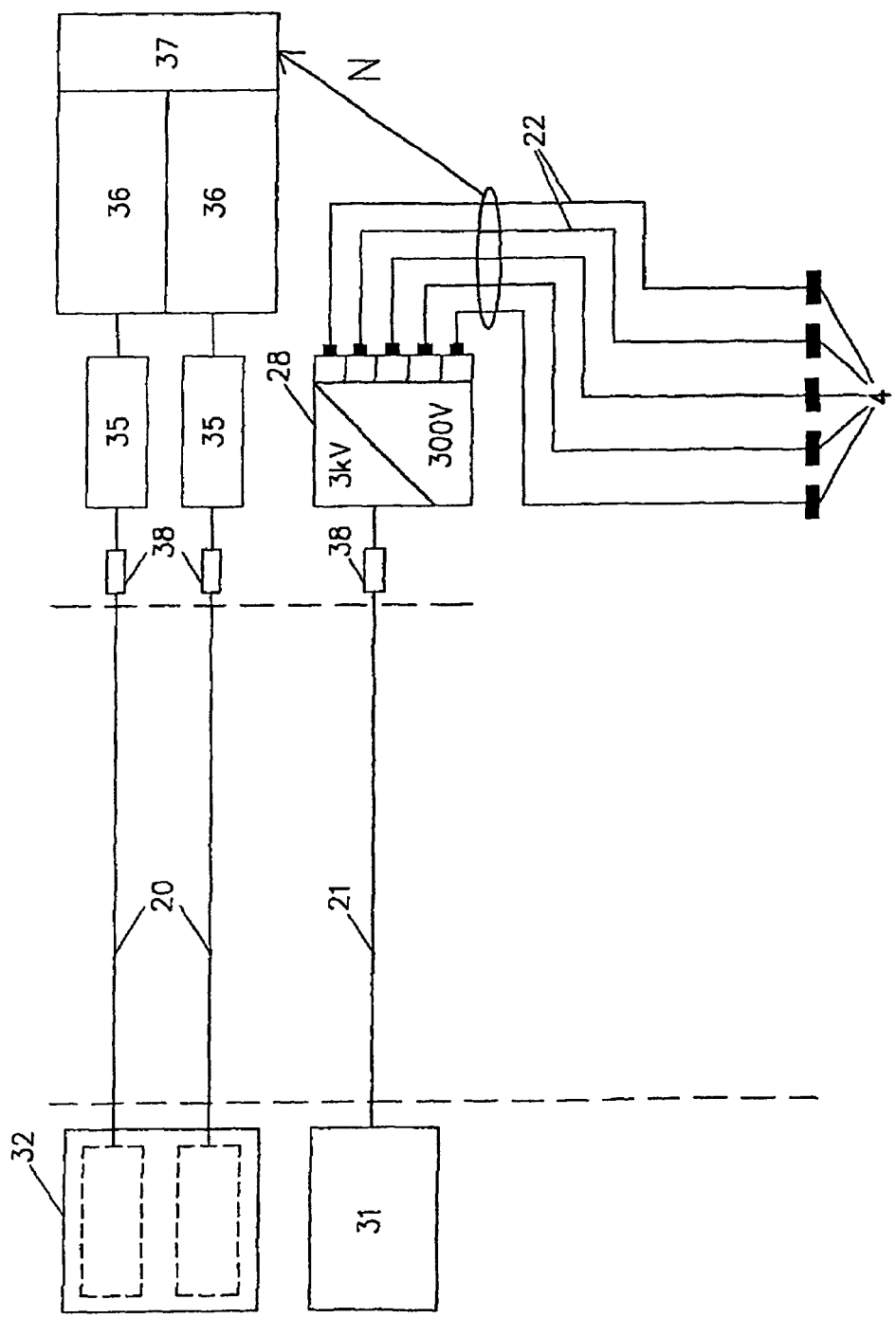
FIG. 5 illustrates the system according to an embodiment of the invention.

FIG. 5 illustrates the system according to an embodiment of the invention where electrical power is transferred from a land based power station 31 via the electrical high voltage cable 21 to the transformer 28 and further via a number of low voltage cables 22 to the underwater installations 4.

The optical signals are transmitted in a similar manner from a control station 32 onshore, in this diagram via two optical modems to two optical fibres 20 down to the ocean floor. In a terminating head the optical fibres are terminated in two optical modems 35 which redistributes the signal to a signal transformer 36 and a UHF radio transmitter 37 in a suitable, possibly coded, form. The radiated signal from the radio transmitter is picked up by the low voltage cables which then function as antennae and transfer the control signals further to the underwater units 4, where they can be received using a radio receiver arranged in proximity to the associated power supply cable 22. The distances between the radio transmitter, the receiver and the low voltage cables 22, respectively, will depend on the local conditions and how easy the electromagnetic waves propagate through the surroundings. In some cases the UHF unit 37 may be physically separated from the cables in such a way that the signals have to propagate through water over a certain distance.

As illustrated in FIG. 3, the optical fibres 20 and the high voltage cable 21 normally will be included in the same umbilical but other solutions may be envisaged. The fibre and cable terminations 38 may then correspond to the coupling unit 9 illustrated in FIG. 3 and hence in reality be constituted by the same coupling unit.

The invention claimed is:

1. System for the transmission of signals to or from underwater installations, having optical fibres for transmission of signals to and from a control unit or between the installations, and comprising:
   a conversion unit coupled with one end of each of the optical fibres for conversion of optical signals to radio signals or conversion of radio signals to optical signals,
   a coupling unit coupled to an electric power supply cable for transmission of power to the underwater installations, where the coupling unit is coupled to the conversion unit, to transfer the radio signals along the power supply cable to or from the underwater installations, and
   at least one transducer unit in each underwater installation for receiving or emitting of the radio signals, and wherein there is a wireless connection between the conversion unit and the cable or other components of the system.

2. System according to claim 1, wherein the underwater installation comprises several separate underwater units, each unit comprising a separate coupling unit.

3. System according to claim 1, wherein the coupling unit is electrically coupled to a power supply cable.

4. System for the transmission of signals to or from underwater installations, having optical fibres for transmission of signals to or from a control unit or between the installations, and comprising:
   a conversion unit coupled with one end of each of the optical fibres for conversion of optical signals to high frequency radio signals or conversion of high frequency radio signals to optical signals,
   a coupling unit coupled to an electric power supply cable for transmission of power to the underwater installations, where the coupling unit is coupled to the conversion unit, to transfer the high frequency radio signals along the power supply cable to or from the underwater installations, and
   at least one transducer unit in each underwater installation for receiving or emitting of the high frequency radio signals, and wherein the coupling unit comprises a radio receiver or radio transmitter for wireless transmission between the coupling unit and the power supply cable.

5. System according to claim 4, wherein the power supply cable is coupled to a radio antenna in the underwater installation.

6. System for the transmission of signals to or from underwater installations, having optical fibres for transmission of signals to or from a control unit or between the installations, and comprising:
- a conversion unit coupled with one end of each of the optical fibres for conversion of optical signals to high frequency radio signals or conversion of high frequency radio signals to optical signals,
- a coupling unit coupled to an electric power supply cable for transmission of power to the underwater installations, where the coupling unit is coupled to the conversion unit, to transfer the high frequency radio signals along the power supply cable to or from the underwater installations, and
- at least one transducer unit in each underwater installation for receiving or emitting of the high frequency radio signals, and wherein the conversion unit comprises a digital-to-analog or an analog-to-digital converter and a high frequency radio transmitter, respectively receiver, for wireless transmission of the signal between the power supply cable and the conversion unit.

7. System according to claim 6, wherein the coupling unit comprises an antenna coupled with the power supply cable.

* * * * *